United States Patent [19]
Chan

[11] Patent Number: 5,515,381
[45] Date of Patent: May 7, 1996

[54] SEQUENTIAL PARITY CORRECTION FOR ERROR-CORRECTING RAM ARRAY

[75] Inventor: Raymond S. Chan, Mountain View, Calif.

[73] Assignee: Tandem Computers Incorporated, Cupertino, Calif.

[21] Appl. No.: 823,078

[22] Filed: Jan. 14, 1992

Related U.S. Application Data

[63] Continuation of Ser. No. 354,670, May 22, 1989, abandoned.

[51] Int. Cl.⁶ .................................................. G06F 11/10
[52] U.S. Cl. .................. 371/37.7; 371/51.1; 395/183.18
[58] Field of Search ........................... 371/13, 40.1, 40.2, 371/49.1, 49.4, 51.1; 395/575

[56] References Cited

U.S. PATENT DOCUMENTS

| | | | |
|---|---|---|---|
| 4,074,229 | 2/1978 | Prey | 371/60 |
| 4,183,463 | 1/1980 | Kemmetmueller | 371/50.1 |
| 4,249,253 | 2/1981 | Gentili et al. | 371/40.3 |
| 4,304,002 | 12/1981 | Hunt | 371/51.1 |
| 4,317,201 | 2/1982 | Sedalis | 371/40.4 |
| 4,355,393 | 10/1982 | Kubo et al. | 371/51.1 |
| 4,360,891 | 11/1982 | Branigin et al. | 364/900 |
| 4,360,915 | 11/1982 | Sindelar | 371/13 |
| 4,360,917 | 11/1982 | Sindelar et al. | 371/51.1 |
| 4,410,988 | 10/1983 | Suelflow et al. | 371/40.1 |
| 4,450,562 | 5/1984 | Wacyk et al. | 371/51.1 |
| 4,472,805 | 9/1984 | Wacyk et al. | 371/51.1 |
| 4,670,876 | 6/1987 | Kirk | 371/3 |
| 4,682,328 | 7/1987 | Ramsay et al. | 371/13 |
| 4,688,219 | 8/1987 | Takemae | 371/10.3 |
| 4,701,915 | 10/1987 | Kitamura et al. | 371/13 |

FOREIGN PATENT DOCUMENTS

| | | |
|---|---|---|
| 173515 | 3/1986 | European Pat. Off. . |
| 43753 | 3/1985 | Japan . |

*Primary Examiner*—Stephen M. Baker
*Attorney, Agent, or Firm*—Townsend and Townsend and Crew

[57] ABSTRACT

An apparatus and method of correcting parity errors in a fault tolerant computer system. Data and associated parity are checked in parallel with use of the data by an ALU. Upon detection of an error, a controller causes the ALU to pass the input data unchanged and associates a correct parity with the input data. The correct parity generation is done in parallel with ALU processing to permit rapid reassociation of data and its correct parity. The reassociated data is returned to the ALU for processing.

13 Claims, 2 Drawing Sheets

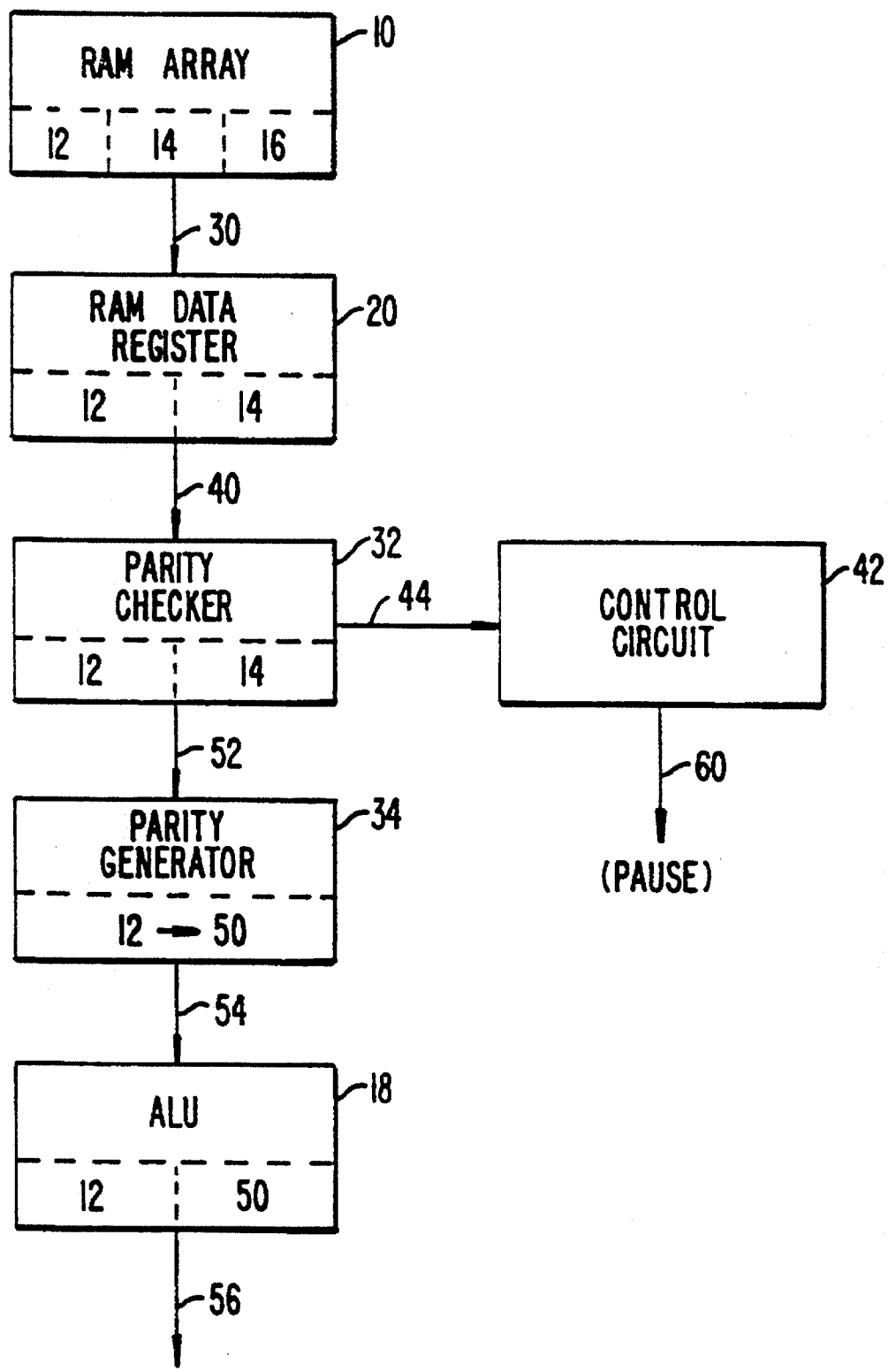
FIG._1.  PRIOR ART

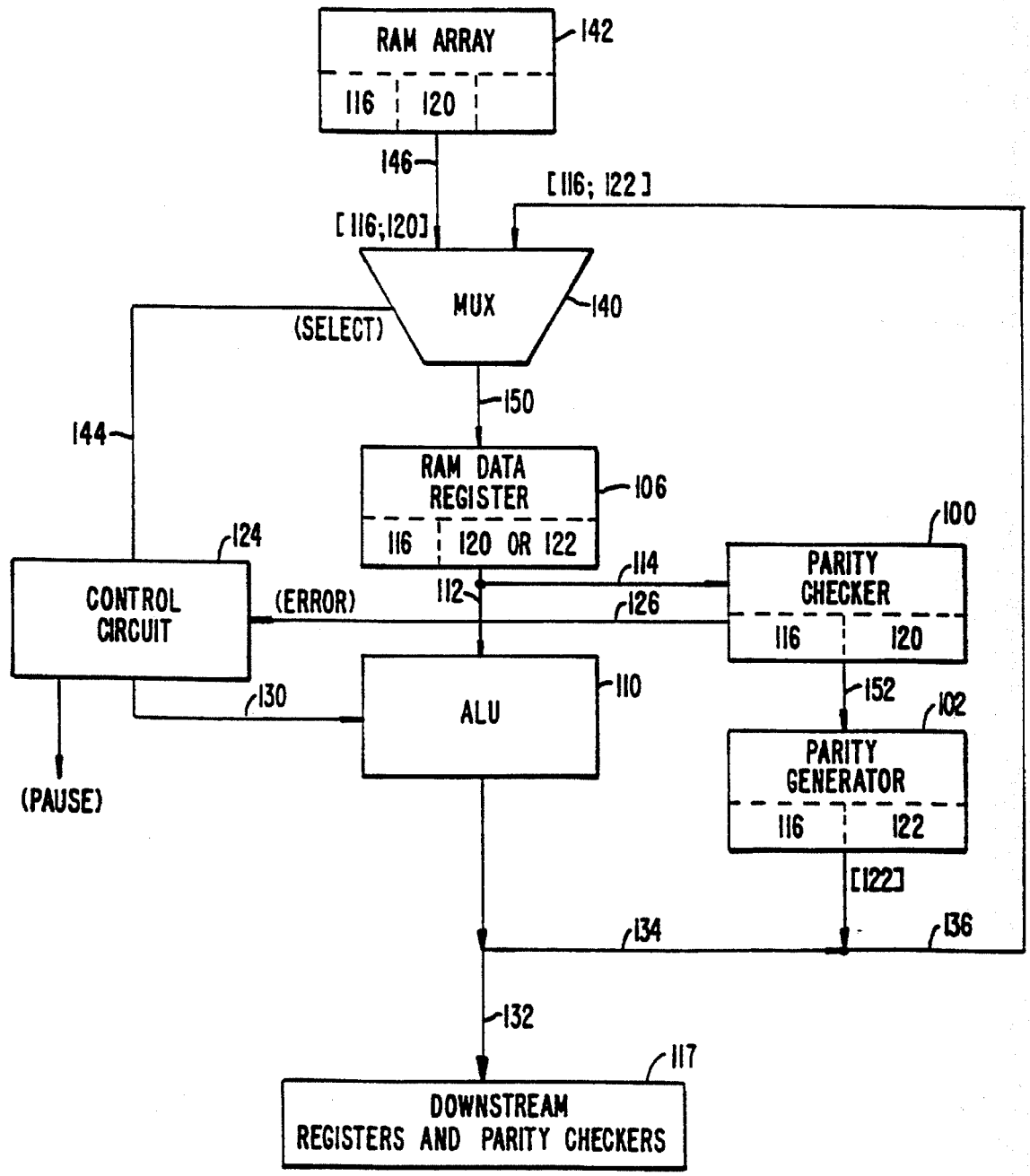
FIG._2.

5,515,381

SEQUENTIAL PARITY CORRECTION FOR ERROR-CORRECTING RAM ARRAY

This is a Continuation of application Ser. No. 07/354,670 filed May 22, 1989, now abandoned.

FIELD OF THE INVENTION

This invention relates to a sequential parity correction apparatus. More specifically, this invention relates to an apparatus and method of correcting parity errors in a fault tolerant computer system.

BACKGROUND OF THE INVENTION

In standard computer systems, errors in data processing can occur which will halt operation of the computer system. These errors can be caused by, among other things, erroneous data or erroneous microcode. Both data and microcode are stored in memory devices which occasionally fail, and faulty information will be accessed from the memory device. To help ensure the integrity of data, additional data called a parity bit is added to stored information. Generating and checking parity data are well known in the computer art. If a parity check indicates that faulty data exists, conventional computers generate an error indication, and operation is halted until an operator intervenes. Some systems have the capability of correcting single bit errors, but cannot correct double bit errors in a word.

To overcome this difficulty, as well as provide other benefits, fault tolerant computers were developed which use "correctable" sources for some of the data, as well as error correction hardware and algorithms to correct errors. A correctable source refers to the ability of the computer to identify and correct faulty data stored in the device without the computer shutting down or requiring operator intervention. One implementation of fault tolerance is directed to data stored in a random access memory (RAM). A system was developed by which faulty data accessed from the RAM could be detected and corrected, without appreciably or adversely affecting the performance of the computer.

A time-critical path refers to a data path which is the slowest, or among the slowest, with respect to a particular operation sought to be implemented and measured. The importance of a data path being denominated a time-critical path, is the realization that in operating a computer it does not matter whether other parts of the machine operate at very fast speeds. The overall system cannot operate any faster than its slowest path. Therefore, to enhance computer capabilities, time-critical paths are analyzed and methods are sought to increase their performance.

The paths which data takes from its storage in RAM and its eventual use by a processing device are traditionally two such time-critical paths. The first path is from the RAM to the register. The second path is from the register through the ALU. Actually, the ALU is a separate time critical path. Typically, data in the RAM is accessed and temporarily stored in a RAM data register before the data is used. By use of a RAM data register, the effective time required to address data and use the data was reduced as data could be accessed from storage while a processing device was busy. The addition of a data register was crucial to increase the overall speed of a computer since data could be stored in the register in anticipation of its use and therefore accessed from the register much faster than directly out of the RAM.

FIG. 1 shows a prior art fault tolerant implementation which used a parity checker and generator in a data path between a RAM data register and a ALU. In a memory storage device, such as a RAM array 10 which is correctable, there is stored: a data word 12, parity data 14 for the stored data word 12, and spare memory 16 is provided in the storage device to allow the RAM to be self-correcting. A processing device 18, herein depicted as an ALU, executes instructions and process data accessed from the RAM array 10. A RAM data register 20 enhances the access time of the ALU 18 to data stored in the RAM array 10. A data path 30 carries both the data word 12 and the parity data 14 associated with the data word 12. The data may be carried either serially or in parallel, as is well known to those skilled in the art.

A parity checker 32 and parity generator 34 are interposed between the RAM data register 20 and the ALU 18 to test the data word 12 accessed from the RAM array 10 before it is processed by the arithmatic logic unit (ALU) 18. It is understood that in practice, a parity generator 34 and a parity checker 32 often share much of the same circuit elements. They are shown separated due to their functional distinctions and to ease understanding. A data path 40 provides the data word 12 and the parity data 14 to the parity checker 32 from the RAM data register 20. Upon detection of an .error, a control circuit 42 is provided an error signal from the parity checker 32 via a path 44 which pauses downstream registers while the parity generator 34 generates the correct parity data 50 for the data word 12. Only the data word 12 is supplied to the parity generator 34 on data path 52 to allow the parity generator 34 to generate good parity for all data accessed from the RAM array 10, whether it is actually faulty or not. Thus, a data path 54 will provide the data word 12 and the generated parity 50 to the ALU 18. When the generated parity 50 is ready, the control circuit 42 allows the processing of the data word 12 to continue. Then the ALU 18 may perform an instruction on the data word 12, with the output of the ALU 18 appearing on a data path 56 to be sent to other registers and tested by other parity checkers. The control circuit 42 also initiates an error correction algorithm to correct the faulty data stored in the RAM, and to purge the system of erroneous data and calculations.

The prior art sequential parity correction system, while acceptable for many applications, has the drawback that the parity checker 32 and parity generator 34, a relatively slow device, are in a critical path with the ALU 18. Therefore, the ALU 18 may not begin processing the data until after the parity checker 32 has determined whether a parity error has occurred, and the parity generator 34 has generated correct parity 50. Usually, the data will be good, which means a needless delay has been added to the time-critical data path described above. The delay arises because the parity generator 34 generates correct parity 50 for each and every data word 12 regardless of whether an error has occurred.

As discussed above, ALU's contain a time critical path. Some prior art systems had the practice of following an ALU with a parity generator whereby parity data for a result calculated by the ALU would have parity associated with it by generation of parity for the result. The method had two disadvantages: 1) a slow device was put in a time critical path; and 2) if the result was faulty, correct parity would be generated for the faulty data and downstream registers would not detect an error. To improve performance, parity prediction was implemented. Parity prediction is a method of calculating a data words parity for the result calculated by the ALU. Parity prediction uses a separate circuit in parallel with the ALU to calculate the parity of an ALU result of an operation on data words A and B. The parity prediction uses A, B, and the parity for A and B to predict what the parity will be for the result of the operation on A and B. Therefore, the predicted parity is independent of the correct operation of the ALU as it is not based on the result. The prediction circuitry is outside any time critical path of the ALU and will allow downstream parity detectors to determine if a failure occurred.

There may be other time critical paths which are slower still; therefore for certain applications the error correcting system of the prior art would be functional and useful.

SUMMARY OF THE INVENTION

The present invention enhances the performance of computing systems while preserving the fault-tolerant characteristics of the correction system. With computing systems, there is always the desire to increase overall system speed. To increase speed, the time critical paths are analyzed and ways are sought to increase the performance of all such paths. The present invention is an improvement in the speed and efficiency of sequential parity correction in the time-critical path between a correctable memory source and a processing device utilizing the data. The invention utilizes a parity checker and generator, but these are taken out of the time-critical path between the RAM data register and the ALU and placed in parallel to the ALU data path. The parity checker tests the data input into the ALU without interfering with the ALU's operation. That is, while the testing is being performed, the ALU is executing its instructions and processing the data. If the data is good, processing continues and no delay has been added to the data path for parity checking.

In the unlikely event that faulty data has been detected, the parity checker generates an error signal indicating that faulty data exists. This error signal is input to a control circuit which performs several functions. First, all downstream registers which may pass the data to other parity checkers to detect the faulty data are temporarily "paused." This prevents any downstream error detectors from freezing the system. Next, the ALU is commanded to pass, unchanged, the faulty data to the output. The data is combined with new parity data which has been generated by a parity generator connected to the parallel parity checker. This generated parity data is now correct for the data, though the data itself may be faulty, and is substituted for the data in the RAM data register to be re-input into the ALU.

Once the data is substituted, which is a relatively fast operation, the control circuit allows the ALU to process the new data, and downstream registers are permitted to resume normal processing. The present invention has a further advantage in that the actual algorithm used to correct the data is unchanged from that used in the prior art.

The error correcting circuitry and method are not part of this disclosure. It must be appreciated that an error signal may be generated by the parity checker 32 upon either of two conditions. The first is that the data word 12 is incorrect and its parity data 14 is good. The second condition is that the parity data 14 is faulty, while the data word 12 is correct. The present invention does not discriminate between these two fault conditions.

DESCRIPTION OF THE DRAWINGS

FIG. 1 is a block diagram of prior art circuitry for sequential parity error correction; and FIG. 2 is a block diagram of the preferred embodiment of the present invention.

DETAILED DESCRIPTION OF THE INVENTION

FIG. 2 is a block diagram of the preferred embodiment. As will be described, the present invention improves upon the performance of the prior art system.

As in the case of the prior art, the invention uses a parity checker 100 and a parity generator 102 to verify data passing from a RAM data register 106 to an ALU 110. However, the parity checker 100 and generator 102 are disposed out of the data path which couples the RAM data register 106 to the ALU 110, allowing a direct connection via a data path 112. The parity checker 100 tests the data in parallel with the ALU 110 through the use of parallel data path 114 and therefore does not delay the processing of data word 116 by the ALU 110. The ALU 110 normally predicts parity, as described above, for the result of its operation instead of generating parity for the result. Thus, the output of the ALU 110 will be faulty if faulty data is input. As parity prediction relies upon the parity of the data word input, if this parity is wrong, erroneous prediction will occur. Thus, the parity must be generated for the data after a parity error has occurred.

The original fault tolerant characteristics of the prior art system need to be preserved. By taking the parity generator 102 out of the direct path between the RAM data register 106 and the ALU 110, the ALU 110 occasionally will have a data word 116 input for which the parity 120 is incorrect. If the system were allowed to continue, downstream destination registers and parity checkers 117 would eventually detect the error and freeze the system. Thus parity generator 102 is provided to generate correct parity 122 for the data word 116 as in the prior art.

The parity checker 100 generates an error signal indicating that a parity error exists for the data word 116. As in the prior art, the error signal is supplied to a control circuit 124 via path 126 which pauses all registers and operations which may detect erroneous data and freeze the machine. The control circuit 124 has other functions in the present invention in addition to that described above. The control circuit 124 supplies a signal on path 130 to the ALU 110 to command the ALU 110 to pass the data word 116 appearing at its input unchanged to its output. As the downstream registers are paused, data appearing on line 132 cannot proceed except via the alternate path depicted by data paths 134 and 136. On data path 134, there appears only the data word 16 passed by the ALU 110. Generated parity 122, which is correct for the data word 116 appearing on data path 134, is combined with the data word 116 with both proceeding along data path 136 to an input of a multiplexer 140.

The multiplexer 140 is inserted between the RAM array 142 and the RAM data register 106. A first input of the multiplexer 140 is connected to the RAM array 142 to provide RAM array data to the RAM data register 106, and ultimately to the ALU 110. A second input of the multiplexer 140 is connected to the data path 136 as described above. An address select signal is supplied from the control circuit 124 to the multiplexer 140 via data path 144. It is well known in the art on the use of a multiplexer to select one of a pair of inputs and subsequently output data from the multiplexer.

In operation, a data word 116 accessed from the RAM array 142 is coupled to the first input of multiplexer 140 via data path 146. In the absence of a detected error, the multiplexer 140 will have the first input selected by the control circuit 124, which allows the data word 116 and its parity data 120 to be passed to the RAM data register 106 via coupling by data path 150. The data word 116 and the parity data 120 are temporarily held in the RAM data register 106 until needed by the ALU 110. When the ALU 110 is ready for the data, the data word 116 is input into the ALU 110. During this time, the parity checker 100 begins to test the parity data 120 against the data word 116 to determine if a parity error exists. In the usual case, the parity test will determine that no error exists, which means that the system has not lost any time as the ALU 110 has been operating on the data word 116.

In the unlikely circumstance that a parity error exists, the parity checker 100 will detect the error and generate an error signal to pass to control circuit 124 via data path 126. It is understood by those of ordinary skill in the art that an error indication could be as performed in the preferred embodiment, that is, by positively generating a signal when an error occurs. It is also known that an error signal could be the termination of a signal indicating that parity is good. The parity generator 102 generates parity for the data word 116 passed to it by the parity checker 100 coupled to the generator 102 via data path 152. The control circuit 124 performs three functions upon receiving an error signal from the parity checker 100. First, the control circuit 124 issues a signal which pauses all destination registers downstream from the ALU 110 and data path 132. This prevents downstream parity checkers from detecting the parity error and freezing the system. Second, the control circuit 124 issues a command to the ALU 110 requiring it to pass the data word 116 to its output, unchanged. Thus, the original data word 116 appears at data paths 132 and 134. Due to the fact that registers downstream from the ALU 110 and data path 132 are now paused, the data word 116 will not propagate downstream along data path 132, but will only proceed along data path 134 to data path 136. At data path 136, the data word 116 (which was passed by the ALU 110), and the generated parity 122 (which was generated by the parity generator 102), are combined and both proceed to the second input of the multiplexer 140. Third, the control circuit 124 issues an address select signal to the multiplexer 140 to command the multiplexer to select data appearing at its second input, instead of data appearing at its first input, as is the normal operating mode without an error indication. The third function of the control circuit 124 essentially substitutes the corrected parity data 122 for the original parity data 120 after the corrected parity data 122 has been associated with the data word 116 for which it had been generated.

Thereafter, the data word 116 and the corrected parity data 122 proceed normally along data path 150 to the RAM data register 106 where it is temporarily stored. When the ALU 110 is ready to process the data word 116, the data word 116 and the corrected parity word 122 are accessed from the RAM data register 106. The data word 116 is input and processed by the ALU 110, while the parity checker 100 tests the data word 116 against its corrected parity data 122. The test will indicate that the data is good, therefore the control circuit 124 will now unpause the destination registers downstream from data path 132, the ALU 110 will be allowed to process the data word 116, and the multiplexer 140 will once again select data appearing on data path 146 to output to the RAM data register 106. The ALU 110 will execute its instructions upon the data word 116, and the output will proceed downstream to destination registers and parity checkers where no parity errors will be detected, and the system will continue to operate until the error correction method is complete and purges the data word 116. The data paths of the system remain operating and unfrozen, the computer continues to operate without operator intervention. Thus, the desire of improving the performance of parity checking while preserving the fault tolerance characteristics of the computing system are achieved through the use of the novel and ingenious invention presently disclosed.

While the above provides a full and complete disclosure of the preferred embodiments of the present invention, various modifications, alternate constructions and equivalents will occur to those skilled in the art given the benefit of this disclosure. For example, the reference to a RAM data register is only an embodiment. It would be known to a person of ordinary skill in the art to substitute any temporary storage device or method, such as a cache memory, for the register without departing from the present invention.

Thus, the invention is not limited to the specific embodiment described herein, but is limited as defined by the appended claims.

What is claimed is:

1. In a data processing computer, a sequential parity error correcting circuit comprising:

a memory device for storing data and associated parity information;

a temporary memory operatively coupled to the memory device for temporarily storing data and its associated parity information retrieved from the memory device;

a processing device, operatively coupled to the temporary memory, for processing the data temporarily stored in the temporary memory and providing the result at a data output terminal;

a parity checker, operatively coupled to the temporary memory in parallel with the processing device, for testing the stored data with its associated parity information, and generating a signal indicating the status of the test;

a parity generator, operatively coupled to the parity checker, for generating correct parity for the stored data and providing the result at a parity output terminal;

a multiplexer having a first multiplexer input terminal coupled to the memory device, a second multiplexer input terminal coupled to the processing device data output terminal and the parity output terminal, and a select terminal;

a control circuit, operatively coupled to the parity checker and responsive to the status test signal;

the control circuit operating in response to a failed parity indication to pause data paths coupled to the processing device data output terminal, to cause the processing device to pass the stored data directly to its data output terminal and to select the second multiplexer input terminal; and the control circuit operating in response to the absence of a failed parity indication to select the first multiplexer input terminal;

such that in the event of a failed parity indication, the correct parity is substituted for the stored parity information and input along with the stored data to the temporary memory for subsequent input to the processing device.

2. In a computer having a memory to store data composed of data words and associated parity for the data words, a temporary storage device coupled to the memory for temporarily storing data words read from the memory, a processing device having a data input port coupled to the temporary storage device and a command port for causing the processing device to pass a data word at its input to an output, and an output data path from the output of the processing device, a parity correction apparatus comprising:

a multiplexer operatively interconnected between the memory and the temporary storage device, the multiplexer having a first data input coupled to the memory, a second data input, an output coupled to the temporary storage device, and having an address select to determine which of the first and second data inputs is routed to the output;

a parity checker operatively coupled to the temporary storage device in parallel with the processing device to test the data word being read from the temporary storage device against the associated parity such that the parity checker will generate an error signal upon detection of a parity error;

a parity generator operatively coupled to the parity checker to generate correct parity for the data word read from the temporary storage device, the generator outputting a correct parity on a data path operatively coupled to the second input of the multiplexer;

means for combining the correct parity and the data word passed from the processing device onto the data path operatively coupled to the second input of the multiplexer; and a control circuit operatively coupled to the parity checker, the processing device, and the multiplexer, the control circuit responsive to the error signal to generate a first signal, a second signal, and a third signal, such that the first signal pauses the further processing of the data word by a downstream register, the second signal operatively coupled to the command port of the processing device to pass the data word unchanged, and the third signal coupled to the address input of the multiplexer to select the second input in lieu of the first input when the error signal is present.

3. The sequential parity correction circuit of claim 2 wherein the processing device is an arithmetic logic unit.

4. The sequential parity correction circuit of claim 2 wherein the temporary memory device is a register.

5. The sequential parity correction circuit of claim 2 wherein the temporary memory device is a cache memory.

6. In a data processing system having an error correcting memory system using a ram array operatively coupled to a processing device, a sequential parity correction circuit comprising:

a multiplexer having a first input operatively coupled to the ram array and an output operatively coupled to the processing device;

a parity checker operably coupled to the output of the multiplexer, and coupled to the multiplexer in parallel to the processing device, to test the parity of a data word input to the processing device, the parity checker generating a signal indicating the condition of the parity for the data word;

a parity generator operably coupled to the parity checker and responsive to the signal generated by the parity checker to generate and output correct parity data for the data word input into the processing device when the parity checker signal indicates that a parity error has occurred, the output of the parity generator operably coupled to a second input of the multiplexer; and a control circuit operably coupled to the parity checker and responsive to the signal generated by the parity checker when the signal indicates that a parity error exists, the control circuit generating a first signal, the first signal operatively coupled to the processing device to cause the data word input to the processing device to be passed to the output of the processing device, the processing device output operatively coupled to the second input of the multiplexer, the control circuit generating a second signal, the second signal operatively coupled to registers in the data processing system to temporarily pause processing such that the detected parity error is prevented from triggering any downstream error detectors, and the control circuit generating an address signal, the address signal operatively coupled to an address input of the multiplexer such that data at the first input to the multiplexer is selected and passed to the output of the multiplexer except in those instances when the signal from the parity generator indicates that a parity error has occurred and then the data input into the second input of the multiplexer is selected and passed to the output of the multiplexer.

7. In a data processing system having a memory system coupled to provide a data word and an associated parity word to a processing device, a parity substituting apparatus comprising:

means for parallel testing of parity for the data word and associated parity word input into the processing device to provide an error signal indication of a parity error;

means for generating another parity word for the data word input to the processing device without regard to the correctness of such data word, in parallel with the processing device;

means, responsive to the error signal, for substituting the another parity word with the data word then input to the processing device in place of the associated parity word, and applying the another parity word and the data word to the processing device; and means, responsive to the error signal, for pausing downstream registers from additional processing of data from the processing device until the association of the data word and another parity word has occurred and parity testing provides no indication of a parity error.

8. In a data processing system having a memory system using a ram array operatively coupled to an ALU, a parity correction apparatus comprising:

means for parallel testing of parity for a data word input into an ALU to provide an error signal indication of a parity error;

means for generating correct parity for the data word input to the ALU, in parallel with the ALU;

means, responsive to the error signal, for associating the correct parity with the data word and substituting the associated correct parity and data word to the ALU; and means, responsive to the error signal, for pausing the processing of data downstream from the ALU until the association and substitution of the data and parity has occurred.

9. A method for correcting parity in a data processing system having a source memory for storing a plurality of data words and parity data associated with each of the plurality of data words, and a processing device to operate upon each of the data words sequentially read from the memory, the method comprising the steps of:

parallel testing the parity of each of the data words input to the processing device to provide an error signal indication of a parity error: generating, in parallel to data processing by the processing device, another parity for the each of the data words input to the processing device without regard to the correctness of such data word;

associating the another parity with the input data word and inputting the data word back to the processing device; and pausing the downstream registers from additional processing of data until the another parity has been associated with the data word and parity testing provides no error signal indication of a parity error.

10. A method for substituting parity data in a data processing system having a source memory for storing a plurality of data words each having associated parity data, a temporary storage device coupled between the memory and an arithmetic-logic-unit (ALU), the method comprising the steps of:

parallel testing each of the plurality of data words input into the ALU against the associated parity data;

generating an error indication of failed parity;

generating, in parallel to ALU data processing, another parity data for each of the plurality of data words without regard to correctness of such data word;

responding to the error indication by pausing downstream registers in a data path coupled to an output of the ALU, passing the data word to the output of the ALU unchanged, and combining the unchanged data word with the another parity data and rerouting the combined unchanged data word and another parity data to the ALU.

11. A data processing system, comprising:

memory means for storing and supplying a plurality of data words each having associated therewith parity data;

processing means having an input coupled to the memory means for receiving a selected one of the data words thereat and an output;

at least one downstream register coupled to the output of the processing means for receiving data therefrom;

parity circuit means coupled to the memory means to receive the selected one of data words and associated parity data for producing an error signal when a parity error is detected, the parity circuit means including means for generating a substitute parity data corresponding to the selected one of data words and without regard to correctness of such data word;

first circuit means responsive to the error signal for associating the substitute parity data for the associated parity data, and for communicating the selected one data word and the substitute parity data to the input of the processing means and the parity circuit means so that when the selected one data word and the substitute parity data are coupled to the parity check means no error signal is produced; and second circuit means coupled to receive the error signal to pause the downstream register from processing data from the processing means until after the substitution of the substitute parity data with the data word has occurred and parity error detection produces no error signal.

12. The data processing system of claim 11, wherein the first circuit means includes multiplex means coupled to the memory means and the input of the processing means for operating in a first mode, in absence of the error signal, to communicate the selected one data word and the associated parity data to the processing means, and in a second mode, in response to the error signal, to communicate the selected one data word and the substitute parity data to the processing means.

13. The data processing means of claim 12, including temporary storage means interposed between the multiplex means and the processing means for temporally holding the selected one data word.

* * * * *